United States Patent Office 3,034,048
Patented May 8, 1962

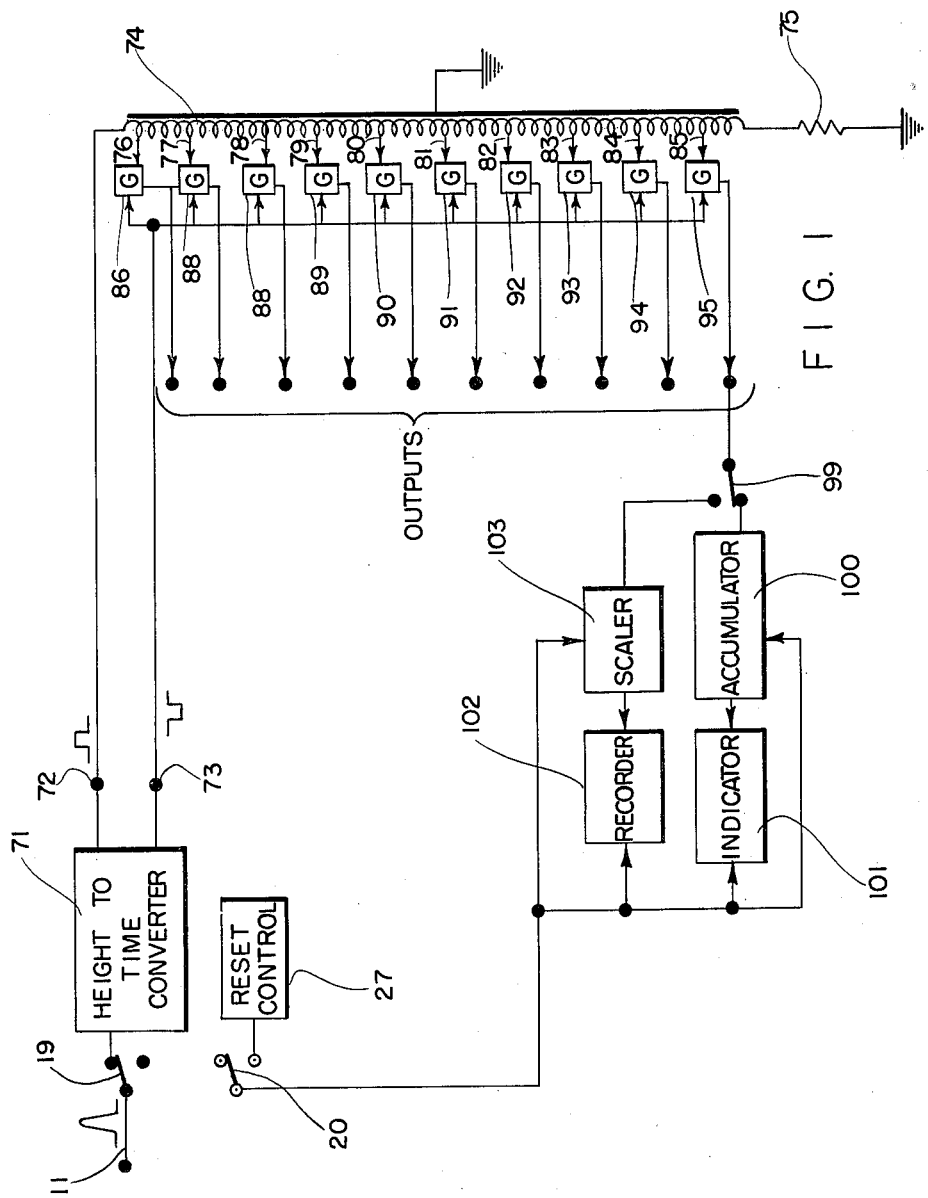

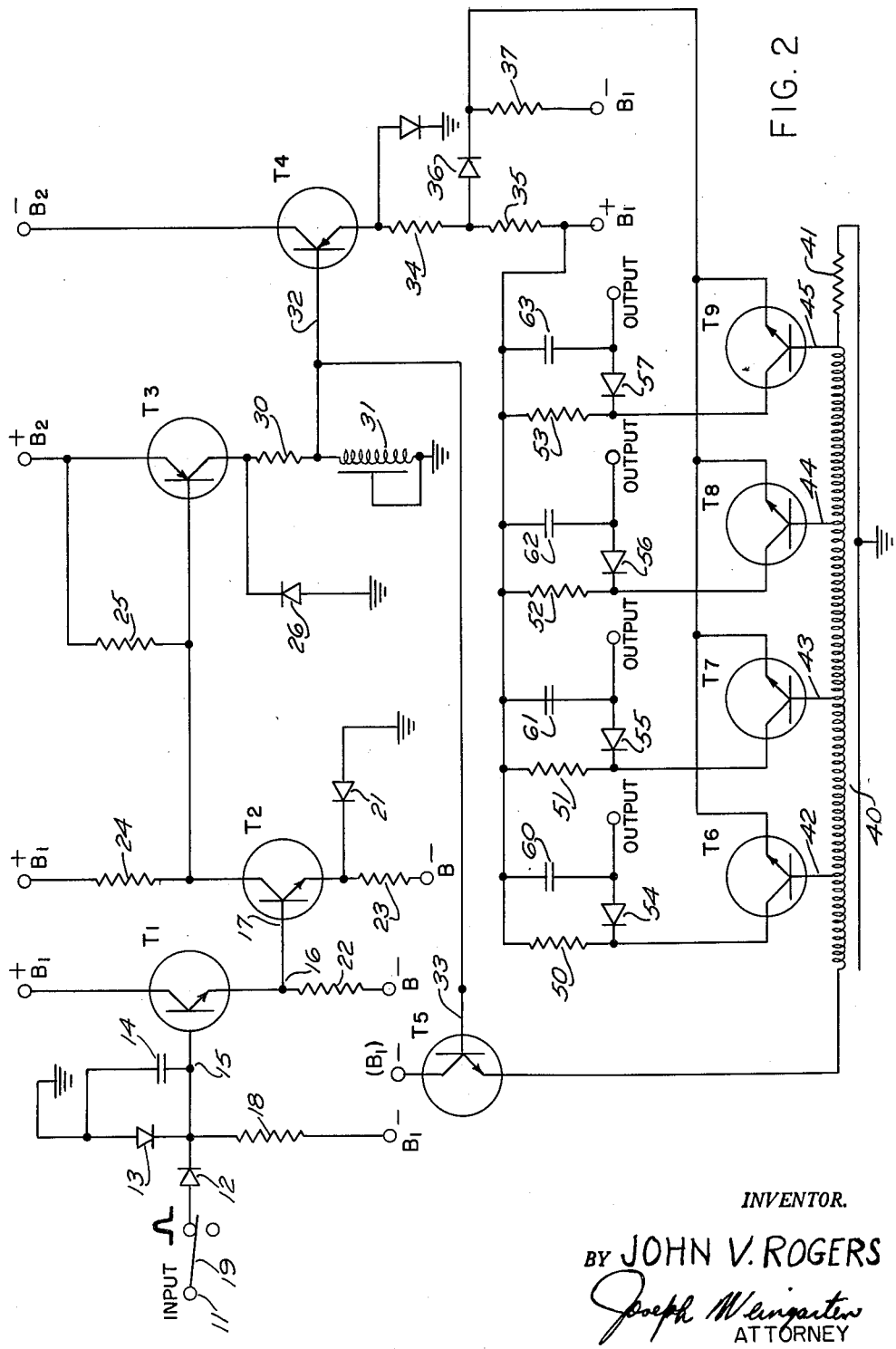

3,034,048
SIGNAL ANALYZING CIRCUITS
John V. Rogers, San Rafael, Calif., assignor, by mesne assignments, to Laboratory for Electronics, Inc., Boston, Mass., a corporation of Delaware
Filed Dec. 1, 1959, Ser. No. 856,603
7 Claims. (Cl. 324—68)

This invention relates in general to apparatus for investigating the characteristics of electrical pulse trains and more particularly to an economical, compact pulse height analyzer.

Electrical pulse height analyzers are well known in the art. The function of a pulse height analyzer is to segregate and record the number of pulses occurring within a given pulse height amplitude range for a sequence of pulses of varying amplitudes. The devices have application in many fields in which some physical parameter is translated into an electrical pulse and more particularly where the voltage amplitude of the electrical pulse is itself indicative of intensity, energy, or some other physical parameter. These circuits have been particularly useful in the measurement of radiation. Two distinct types of analyzers have been developed; one being the "single channel" analyzer in which, in any given time, only those pulses falling within one set of limits are counted, and the other being "multichannel" analyzers in which each pulse which arrives at the input of the analyzer is classified into one of a group of amplitude categories. In the former type the "window" of the channel, which consists of a lower discriminator and an upper discriminator, must be moved across the entire range of pulse heights of interest, and the number of pulses per unit time appearing within it are serially recorded. In the latter type each pulse is recorded in that particular channel whose lower limit is exceeded by the pulse and whose upper limit is not exceeded.

Multichannel analyzers have been widely used and highly developed because of the inherent efficiency of measuring the entire pulse height spectrum in a single measurement period. The number of channels employed will, of course, vary with the particular application and the desired amplitude resolution of the measurement. In general these analyzers may include anywhere from five to one hundred channels. As indicated above, a complete multichannel analyzer would, in its most advantageous application, have all channels operating simultaneously thereby forming a spectrometer suitable for obtaining in one measurement the complete pulse height spectrum. Pulses would, in this instance, be applied through a suitable switching means for a predetermined period of time, the time to be sufficiently long to obtain an appropriate number of input pulses as required for that application.

In order to best understand the required characteristics and function of each of the channels in a multichannel analyzer, a single channel will first be discussed. The fuction of each discriminator channel is to provide an output to a recorder or storage unit if the amplitude of the pulse presented at the input of the analyzer is greater than the lower discriminator level of the channel but less than the upper discriminator level of the channel. Normally this is accomplished by providing each channel with only a lower discriminator level and utilizing the next higher channel's discriminator to provide an upper limit. If the amplitude of a particular pulse exceeds the lower level of a given channel, two outputs are provided. One output is coupled to the preceding channel, and the second output is provided to a coincidence gate leading to the storage or recording unit. If the channel following the channel in question also has its low level discriminator exceeded, then it provides a pulse back to the channel in question at the coincidence gate to prevent the output from reaching the storage unit. Each channel then may be thought of as having four functions; one being to determine whether the pulse amplitude exceeds its lower discriminator level, a second to provide an output pulse to a storage unit, a third to provide an inhibiting pulse to the next lower channel, and a fourth to accept an inhibiting pulse from the next higher channel.

In typical multichannel analyzers heretofore available, each channel requires two or three electron tubes as well as a highly stable voltage bias supply in order to accomplish these functions. The power consumption per channel of a conventional multichannel analyzer lies in the range of 5 to 10 watts. This power consumption together with the physical size of the components results in a rather large physical size which generally is in the order of 2 to 5 cubic feet for a ten channel analyzer. Operationally one of the inherent difficulties of conventional multichannel analyzers is the problem of maintaining the bias voltage level for each discriminator extremely stable, which in turn means very precise and stable voltages which do not drift despite variation in supply voltages.

The above mentioned characteristics and limitations, which may not cause undue restriction in an instrument to be operated within a laboratory, render entirely impractical the use of multichannel analyzers in many environments where the acquired data would be invaluable, such as missile test probes and radioactive oil well logging equipment.

It is therefore a primary object of the present invention to provide a compact, stable, efficient and economic multichannel pulse height analyzer.

It is another object of the present invention to provide a low power drain pulse amplitude analyzer which by virtue of its compactness and low weight is particularly suited for airborne applications.

It is still another object of the present invention to provide a multichannel pulse height analyzer in which the discrimination level of each channel remains in an absolutely fixed relation to the discriminator level of every other channel.

Broadly speaking, the pulse height analyzer of this invention operates on the principle of converting the pulse amplitude voltage into a time analogue, and employing a time-base discriminator to provide the separation analysis. A converter unit at the input of this analyzer provides a pair of pulses as an output. The time separation between these pulses is a linear function of the amplitude of the input pulse. The sorting into categories is then carried out on the basis of time categories. This is accomplished by sending the first pulse down a transmission line having a constant delay per unit length, and recording the pulse position in this line at the time the second pulse is generated.

The voltage to time converter itself provides a constant amplitude output pulse, the duration of which is linearly related to the input voltage amplitude. This pulse is then differentiated such that a positive pulse of very short duration, which occurs coincident in time with the leading edge of the converter pulse, is produced and a negative pulse of short duration coincident with the trailing edge is produced. The pulse coincident with the leading edge will be referred to as the "line pulse," while that coincident with the trailing edge will be referred to as the "gate pulse." The line pulse is transmitted down a constant delay transmission line, which is provided with a number of taps spaced at equal intervals. Each of these taps connects to one leg of a coincidence "and" gate. The output of each of these "and" gates is connected to the storage or recording unit corresponding to that channel. The gate pulse is applied directly and simultaneously to the second leg of all of the "and" circuits. Since the gate pulse occurs at the trailing edge of the converter pulse, and since the duration of the converter pulse is linearly related to the amplitude of the input pulse, then the time elapsing between the occurrence of the generation of the line pulse and the application of the gate pulse to the second leg of each of the coincidence circuits varies with the amplitude of the pulse. This elapsed time is, in fact, a measure of the amplitude of the input pulse. Since the line pulse is traveling along a transmission line with constant delay, the position of this pulse in the transmission line when the gate pulse is applied to the coincidence circuits is a measure of the elapsed time and hence of the input pulse voltage amplitude. Accordingly the position of the coincidence circuit which is energized by this pulse at the time the gate pulse is applied to its other leg serves as an indicator of the pulse amplitude, and the entire apparatus constitutes a multichannel pulse height analyzer.

It will be noted that in this device the positioning of each channel is accomplished by the physical separation along the transmission line of the taps leading to the coincidence circuits; hence the relation of each channel to every other channel is determined only by this physical positioning and is therefore completely stable. Thus, the only active circuit components required after the pulse shaping are the coincidence circuits which may be formed with diodes or transistors. If transistors are also used in the input pulse conversion, an entire ten channel unit requires only a few milliwatts of power. Such a unit is, of course, very compact, occupying less than 100 cubic inches.

Other objects and advantages will become apparent from the following detailed description when taken in conjunction with the accompanying drawing in which:

FIG. 1 is an illustration partially in block diagrammatic and partially in schematic form of an embodiment of this invention; and FIG. 2 is an illustration partly in block diagrammatic form and partly in schematic form of a preferred embodiment of this invention.

With reference now specifically to FIG. 1, the pulses to be analyzed are applied to the input 11 of the circuit, which is coupled through start-stop switch 19 to the height to time converter unit 71. The height to time converter unit 71 provides two outputs 72 and 73. Output 72 is connected directly to one end of transmission line 74, one conductor of which is grounded directly while the other conductor is grounded through terminating impedance 75. This transmission line 74 is provided with ten tap offs 76 through 85 spaced at equal intervals along it. Corresponding to each of these tap offs and having one leg connected to each tap off is a group of ten "and" gates 86 through 95 which operate in such a fashion that they provide an output pulse if, and only if, both of their input legs are energized simultaneously. Output 73 of converter 71 is coupled directly to the second input leg of all the "and" gates 86 through 95 in parallel.

The output of gate 95 is shown connected to the arm of a single throw two position switch 99. One of the terminals of switch 99 is coupled to a pulse accumulator 100, which may be for example a storage capacitor (not shown). The accumulator 100 is in turn coupled to an indicator unit 101 adapted to provide an indication of the number of pulses accumulated in accumulator 100. The second terminal of switch 99 is connected to a scaler unit 103, adapted to digitally count the number of pulses entered, and this scaler 103 is coupled to a Recorder unit 102 for recording the scaler 103 output. This switch is shown on gate 95 by way of example; however, it is clear that all of the gates 86 through 95 may be provided with such switches and output units or each stage may be coupled directly to means for measuring and indicating over a period of time the number of pulses for the corresponding gate. Alternatively, a single indicating unit may be employed which at the end of a measurement period may be coupled sequentially to a storage unit associated with each gate. A reset control 27 is coupled through switch 20 to the counting and recording indicating units to reset these back to a zero position after a measurement is completed in preparation for the next measurement.

The operation of the above described apparatus is as follows. The storage units are reset to the zero position through switch 20, and switch 19 is closed to initiate the measurement. The pulse to be classified appears at the input of the converter 71 which provides two output pulses, both of the same amplitude but having opposite polarity. Each of these output pulses is of short duration, the pulse on output 72 being positive while the pulse on output 73 is negative. The operation of converter 71 is such that while the positive pulse 72 is provided immediately upon the presentation of the input pulse, the negative pulse on output 73 is generated at a time interval after the initial pulse on output 72. The duration of this interval bears a fixed and linear relation to the amplitude of the input pulse.

The positive pulse on output 72 is coupled into transmission line 74 which has a constant delay and hence the pulse from output 72 travels along this transmission line with a known velocity. The leading edge of this pulse then arrives at each of the taps 76 through 85 at a predetermined time after the arrival of the input pulse at the converter 71. Each of these taps will be successively energized by this pulse and the duration of time for which they will be energized depends upon the duration of the positive output pulse from converter 71. This pulse from output 72 is arranged to have a constant duration, which for reasons which will be explained in more detail below must be long enough so that added to the duration of output pulse 73, the total time will be slightly less than the time required for a pulse to travel from one tap off to the next. Negative output pulse 73 from converter 71 occurs at a point in time related, as described above, to the input pulse amplitude and is immediately applied simultaneously to the second input leg of all of the "and" gates 86 through 95, at which time that gate which has its other input leg energized by the pulse from output 72 will be actuated and provide a circuit output. The position of the actuated gate indicates the amplitude classification of the input pulse.

As previously indicated, the totaling and indicating or recording functions may be carried out simultaneously by employing for example a scaler unit and a recorder unit in conjunction with each of the gates 86 through 95, or a single indicator may be sequentially applied to indicate the number of pulses stored in each storage unit.

The positive and negative output pulses from converter 71 must together have a cumulative duration not quite exceeding the time required for a pulse to travel from one tap in the transmission line to the next, in order to insure that when output 73 (which provides the gate pulse) is actuated, the pulse from output 72 is energizing the input leg of no more than one of the coincidence "and" gates, and to minimize the number of input pulses which fail to produce an output.

With reference now to FIG. 2, a schematic representation of one embodiment of the apparatus of this invention is shown. The particular circuit described accepts positive pulses and classifies them into the desired number of amplitude groups, arbitrarily limited to four herein, but corresponding functionally to the ten amplitude groups shown in FIG. 1. By illustrating only four amplitude groups, FIG. 2 has been materially reduced in complexity.

The circuit may be considered in four stages. The first stage constitutes the input circuit and operates as a pulse shaper and height to time converter. Input terminal 11 is coupled through switch 19 to the anode of diode 12, which has its cathode coupled through resistor 18 to a negative voltage source, $B_1^-$. Also coupled to the cathode of diode 12 is the cathode of diode 13 as well as one side of capacitor 14, the other side of capacitor 14 and the anode of diode 13 both being coupled to ground. The base 15 of transistor $T_1$ is also connected directly to the junction between the cathodes of diodes 12 and 13. Transistor $T_1$ is connected as an emitter follower, the output 16 of which is D.C. coupled to the base 17 of transistor $T_2$. Transistor $T_2$ serves as a sharp cutoff amplifier with the action of diode 21 serving to maintain the transistor below cutoff when no positive signal is supplied from transistor $T_1$. Transistors $T_1$ and $T_2$ have their emitters coupled in the conventional fashion through resistors 22 and 23 respectively to negative voltage supply $B_1^-$. Transistor $T_1$ has its collector connected directly to positive voltage supply $B_1^+$, while transistor $T_2$ has its collector coupled through load resistor 24 to the same voltage supply $B_1^+$.

The second stage serves as a pulse pair generator providing the pair of output pulses. The collector of transistor $T_2$, coupled directly to the base of transistor $T_3$, supplies the amplified variable time duration pulse to transistor $T_3$. Transistor $T_3$ has its emitter coupled directly to positive voltage supply $B_2^+$, to which is also coupled, from the base of transistor $T_3$, bias resistor 25. Since transistor $T_3$ is a power transistor, a separate voltage supply $B_2^+$ is used.

The collector of transistor $T_3$ is coupled through diode 26 to ground. This collector is also coupled through resistor 30 to transmission line 31. Transmission line 31 is shorted at the end removed from the collector of transistor $T_3$ and serves as a delay line differentiator differentiating the square wave output from transistor $T_3$. The square wave has a duration controlled by the duration of the pulse on the input of transistor $T_3$ and hence is related to the amplitude of the input pulse to the circuit. Differentiation yields a positive and a negative pulse of short duration, the leading edges of each of these pulses being separated by a time equal to the duration of the square wave. The pulse pair on the collector of transistor $T_3$ is D.C. coupled to the base 32 of transistor $T_4$ and also to the base 33 of transistor $T_5$. Transistor $T_4$ again has its collector connected to negative supply $B_2^-$, while its emitter is connected through resistors 34 and 35 to $B_1^+$. Transistor $T_4$ provides an output which passes only the negative pulse from the differentiated square waves produced on the collector of transistor $T_3$. Diode 36 has its anode coupled to the junction between resistors 34 and 35 and its cathode coupled through resistor 37 through $B_1^-$ voltage supply. The cathode of diode 36 is also coupled directly to the emitters of transistors $T_6$, $T_7$, $T_8$ and $T_9$.

The third stage provides a sorting circuit which clasifies each pulse pair into one of four categories on the basis of the time separation between the pair of pulses. The base 32 of transistor $T_4$, as indicated above, is coupled directly to the base of transistor $T_5$, the collector of which is coupled to $B_1^+$ voltage supply. Transistor $T_5$ is arranged to provide as an output on its emitter only the positive pulse from the differentiated square wave produced at transistor $T_3$, and this is coupled directly to one end of transmission line 40. Transmission line 40 is a conventional constant impedance, constant delay transmission line terminated in its characteristic impedance 41 and having one side grounded. Transmission line 40 has four equally spaced tap offs 42, 43, 44 and 45 along its length. These tap offs are connected respectively to the bases of transistors $T_6$, $T_7$, $T_8$ and $T_9$. Each of these transistors $T_6$ through $T_9$ is arranged as a coincidence circuit, or "and" gate, such that it provides a pulse output of constant current on its collector if, and only if, a positive pulse is on its base simultaneously with a negative pulse energizing its emitter. The constant current is supplied through resistor 37, diode 36 being cut off during coincidence. The collector circuits of each of the transistors $T_6$ through $T_9$ are identical and provide resistors 50, 51, 52 and 53 respectively coupled directly to positive voltage supply $B_1^+$.

The fourth stage serves as an accumulator and storage unit which provides a measure of the number of pulses accumulated in each category. In the circuit shown, capacitors are employed as storage units in order to provide a minimum space and component requirement in the circuit. Corresponding to each coincidence circuit (transistors $T_6$ through $T_9$) are storage capacitors 60 through 63 respectively. Each capacitor is coupled in series with a diode (54 through 57 respectively) to the collector of its corresponding coincidence circuit. The diodes are oriented to pass only negative pulses. There are output terminals corresponding to each of these transistors $T_6$ through $T_9$ and these terminals are located at the junction between diode 54 and capacitor 60 for transistor $T_6$; at the junction between diode 55 and capacitor 61 for transistor $T_7$; at the junction between diode 56 and capacitor 62 for transistor $T_8$; and at the junction between diode 57 and capacitor 63 for transistor $T_9$. A reset control (not shown) would be employed to discharge these capacitors at the beginning of a measurement period.

Having described generally the circuit, its operation will now be discussed in more detail. Upon the application of a positive pulse at input 11, with switch 19 closed, capacitor 14 is charged to the peak potential of this pulse. The charge leaks off capacitor 14 through resistance 18 at a constant rate which is determined by the value of resistance 18 and the negative voltage supply $B_1^-$. This voltage on capacitor 14 decreases until it reaches the point where it is "clamped" by the action of diode 13. During the time when capacitor 14 is charged to a value in excess of this clamping voltage transistor $T_1$, which operates as an emitter follower, provides a positive output pulse to the base of transistor $T_2$. Diode 21 connected to the emitter of transistor $T_2$ maintains this transistor at cutoff by providing an effectively low impedance to ground for the emitter. Upon the impression of the positive pulse on base 17 of transistor $T_2$ the emitter becomes positive thus moving into the region of low conduction of diode 21, allowing transistor $T_2$ to conduct heavily and providing a negative pulse on the base of transistor $T_3$. Transistor $T_3$ is again operated on a sharp cutoff characteristic and its collector has a delay line differentiator operating to differentiate the signal output on it. The output from transistor $T_3$ without the differentiator would normally be a square wave, the duration of which is controlled by the duration of the pulse on its base; the width of this square wave then is related to the amplitude of the pulse at input 11. The differentiator 31 is arranged to have a time constant short compared to any expected duration of the square wave; hence two pulses, one positive at the beginning of the square wave and one negative at the end of the square wave, are generated, their leading edges being separated by a time corresponding to the duration of the square wave. The positive pulse on the output of transistor $T_3$ is the only one passed by transistor $T_5$ and this serves as a "line" pulse. This pulse travels down transmission line 40 and its duration in relation to the length of transmission line 40 is such that it energizes only one of the taps 42 through 45 at a time. The negative portion of the differentiated output of transistor $T_3$ is passed by transistor $T_4$. This pulse serves to energize the emitters of transistors $T_6$, $T_7$, $T_8$ and $T_9$ simultaneously. Transistors $T_6$ through $T_9$ are coincidence circuits which require that both their base and emitter be energized in order to provide a pulse on their collector. A pulse is provided on the collector of one of these transistors then when the line pulse is present at its base at the same time that the gate pulse is present at its emitter. When this occurs the constant current generated in the combination of diode 36 and resistor 37 is passed into the pump circuit corresponding to that transistor. For example in the case of transistor $T_7$, this pump circuit is formed by resistor 51 and capacitor 61. The accumulated voltage on capacitor 61 will then serve to indicate how many pulses have accrued on it during any given period of time.

It will be understood that in order to provide that no pulse be registered in more than one of the capacitors 60 through 63, the duration of the line pulse plus the duration of the negative pulse must not exceed the spacing in time along the transmission line of taps 42 through 45. It also necessarily follows that the determination of which transistor is energized will depend upon the time lag between the positive line pulse and the negative portion of the square wave; hence the determination of the transistor which is energized and of the output which has the pulse represented on it depends upon the amplitude of the input pulse. The circuit as a whole then operates to indicate the number of pulses as a function of their amplitude on the four output terminals.

In the circuit described the charge delivered to each storage capacitor will not be constant, but rather will depend on the duration of the coincidence at the particular tap between the line pulse and the coincidence pulse. This dispersion in charge will lower somewhat the efficiency of the system, but the simplicity and compactness attained by using this type of storage will in many cases be the controlling factors. Where these factors are not controlling, scalers or individual flip flops may be used to accomplish the storage in the well known manner for such devices.

Table I below indicates the values of the components for a typical circuit.

*Table I*

$B_1^+$ ---- 22 volts.
$B_1^-$ ---- −22 volts.
$B_2^+$ ---- 7 volts.
$B_2^-$ ---- −7 volts.
Resistors:
   18 ---- 220K ohms.
   22 ---- 150K ohms.
   23 ---- 22K ohms.
   24 ---- 27K ohms.
   25 ---- 1K ohms.
   30 ---- 1.5K ohms.
   34 ---- 3.3K ohms.
   35 ---- 22K ohms.
   37 ---- 8.2K ohms.
   41 ---- (Value to match line 30).
   50 ---- 100K ohms.
   51 ---- 100K ohms.
   52 ---- 100K ohms.
   53 ---- 100K ohms.
Capacitors:
   14 ---- 100 micromicrofarads.
   60 ---- 60 microfarads.
   61 ---- 60 microfarads.
   62 ---- 60 microfarads.
   63 ---- 60 microfarads.
Diodes:
   12 ---- Type 1N628
   13 ---- Type 1N628
   21 ---- Type 1N34
   36 ---- Type 1N34
   54 ---- Type HD–6009
   55 ---- Type HD–6009
   56 ---- Type HD–6009
   57 ---- Type HD–6009
Transistors:
   $T_1$ ---- 2N167
   $T_2$ ---- 2N167
   $T_3$ ---- 2N384
   $T_4$ ---- 2N384
   $T_5$ ---- 2N167
   $T_6$–$T_9$ ---- 2N167

With these component values the circuit is capable of accepting input pulses from 0 to 3 volts. The discharge rate on the pulse stretcher circuit is one volt per microsecond, the square wave then having a maximum duration of three microseconds. The differentiating time constant is such as to provide a differentiated pulse of .4 microsecond. As a result the maximum spacing between taps on the transmission line 40 in this circuit should just exceed .8 microsecond.

While the analyzer has been described in terms of a particular circuit configuration, the invention herein is not so limited. It is obvious that many modifications and improvements may be made by those skilled in the art; the invention disclosed herein should be construed as limited only by the spirit and scope of the appended claims.

What is claimed is:

1. Apparatus for analyzing a sequence of input pulses comprising, conversion means adapted to provide in response to input pulses of varying amplitude first and second time separated output pulses, said time separation between said first and said second output pulses being related to the amplitude of said input pulses; a transmission line adapted to transmit only said first output pulses from said conversion unit, said transmission line having a plurality of individual tap connections equally spaced along the length thereof; actuating means coupled to each of said taps and to said converter unit and adapted to provide an output signal at the tap position corresponding to the location of said first pulse in said transmission line when said second pulse occurs.

2. Apparatus for analyzing a sequence of input pulses comprising, a converter unit providing an output signal whose duration is proportional to the amplitude of pulses applied to its input; pulse generator means coupled to said converter output and adapted to provide in response to each of said input pulses first and second output pulses, said first output pulse corresponding in time to the leading edge of each of said converter output pulses, said second pulse corresponding in time to the trailing edge of each of said converter output pulses; a constant delay transmission line coupled to said pulse generator means and adapted to transmit only said first pulses from said pulse generator means; a plurality of coincidence circuits, each having first and second input terminals, said coincidence circuits being disposed at spaced intervals along the length of said transmission line, the said first input terminals of said coincidence circuits being coupled to said transmission line at said spaced intervals, said pulse generator being coupled to the said second input terminals of each of said coincidence circuits such that only the second output pulses from said pulse generator are applied to the second input of each of said coincidence circuits, whereby the position of the actuated coincidence circuit provides an indication of the amplitude of each of said input pulses.

3. Apparatus for analyzing a sequence of input pulses comprising, a converter unit providing an output signal of duration proportional to the amplitude of each pulse applied to its input; pulse generator means coupled to said converter output and adapted to provide in response to each of said input pulses first and second output pulses, said first output pulse corresponding in time to the leading edge of said converter output pulse, said second pulse corresponding in time to the trailing edge of said converter output pulse; a transmission line coupled to said pulse generator means and adapted to transmit only said first pulses from said pulse generator means; a plurality of coincidence circuits, each having first and second input terminals, said coincidence circuits being disposed at spaced intervals along the length of said transmission line, the said first input terminals of each of said coincidence circuits being coupled to said transmission line at said spaced intervals, said pulse generator being coupled to the second input terminals of each of said coincidence circuits, whereby the coincidence circuit corresponding to the position in the line where said first pulse is located at the time said second pulse is generated is actuated; a plurality of digital counting elements, one of said digital counters being coupled to each of said coincidence circuits, whereby the number of pulses actuating each of said gates is recorded.

4. Apparatus for analyzing a sequence of input pulses comprising, converter means adapted to provide an output pulse in response to each pulse applied at its input, said output pulses having a duration proportional to the amplitude of each of said input pulses; a differentiator circuit coupled to said conversion means and adapted to time differentiate the output pulses from said conversion means, thereby producing a first signal corresponding to the leading edge of said output pulses, and a second signal corresponding to the trailing edge of said output pulses; a transmission line having a constant time delay per unit length and terminating in a characteristic impedance, said transmission line being provided with a plurality of tap connections spaced at intervals along the length thereof, each of said taps having associated with it an individual coincidence circuit, each of said taps being coupled to one leg of its said associated coincidence circuit; signal separation means adapted to separate said differentiated first and second signals and to apply said first differentiation signal to one end of said transmission line and said second differentiation signal to the second input of each of said coincidence circuits, whereby the coincidence circuit corresponding to the position of said first differentiation pulse in said transmission line is actuated at the time at which said second differentiation pulse is generated; a plurality of charge storage means, one of said plurality of charge storage means being coupled to the output of each of said coincidence circuits, whereby the charge accumulated on each of said plurality of charge storage means provides an indication of the distribution of voltage amplitudes of input pulses to said conversion means.

5. Apparatus in accordance with claim 4 wherein the spaced intervals along said transmission line between said taps correspond to a time delay greater than the combined duration of said first and said second differentiator signals.

6. Apparatus in accordance with claim 4 wherein said converter means comprises a first diode element having first and second electrodes, said first electrode serving as an input terminal, said diode being oriented to pass pulses of one polarity away from said input; a capacitor coupled between said second electrode of said first diode and a point of potential reference, a second diode, having first and second electrodes coupled across said capacitor and oriented to pass pulses towards said point of potential reference of polarity opposite to the polarity of pulses passed by said first diode; a source of direct current voltage having its positive side coupled directly to said point of potential reference and its negative side resistively coupled to said second electrode of said first diode.

7. Apparatus for analyzing a sequence of input pulses comprising, converter means adapted to provide an output pulse in response to each pulse applied at its input, said output pulses being positive in polarity and having a duration proportional to the amplitude of each of said input pulses; a differentiator circuit coupled to said conversion means and adapted to time differentiate the output pulses from said conversion means, thereby producing a first signal positive in polarity corresponding to the leading edge of said output pulses, and a second signal negative in polarity corresponding to the trailing edge of said output pulses; a transmission line having a constant time delay per unit length and terminating in a characteristic impedance, said transmission line being provided with a plurality of tap connections spaced at intervals along the length thereof, each of said taps having associated with it an individual coincidence circuit, each of said taps being coupled to one leg of its associated coincidence circuit; a positive pulse gate and a negative pulse gate coupled to the output of said differentiator circuit, said positive pulse gate serving to pass only said first signals from said differentiator to one end of said transmission line and said negative pulse gate serving to pass only said second signals to the second input of each of said coincidence circuits; a plurality of charge storage means, one of said plurality of charge storage means being coupled to the output of each of said coincidence circuits; a constant charge generator associated with said coincidence circuits; a constant charge generator associated with said negative pulse gate and adapted to provide a predetermined quantity of charge to the associated one of said charge storage means for each actuation of any one of said coincidence circuits.

References Cited in the file of this patent

UNITED STATES PATENTS

| | | |
|---|---|---|
| 2,806,651 | Fernsler | Sept. 17, 1957 |
| 2,905,887 | Taddeo | Sept. 22, 1959 |
| 2,939,002 | Guillon et al. | May 31, 1960 |
| 2,942,194 | Brennan | June 21, 1960 |

OTHER REFERENCES

"Pulse Amplitude Analysis in Nuclear Research," article in Nucleonics, October 1952; pages 50–56.